April 23, 1968     W. PEREZ     3,379,118
BAKING RACK

Filed March 28, 1966     2 Sheets-Sheet 1

INVENTOR.
WILLIAM PEREZ
BY
*Edward Hale*
ATTY

April 23, 1968 W. PEREZ 3,379,118
BAKING RACK
Filed March 28, 1966 2 Sheets-Sheet 2
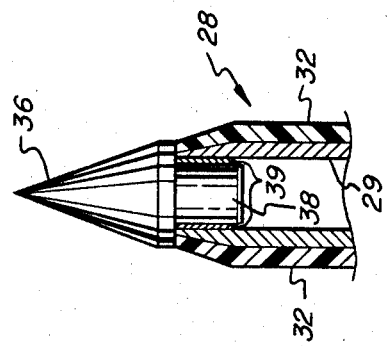
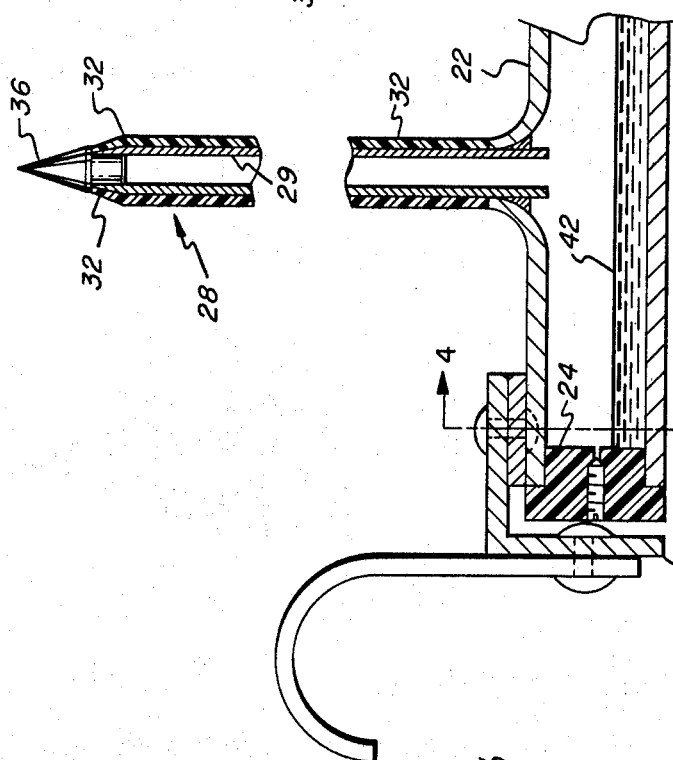
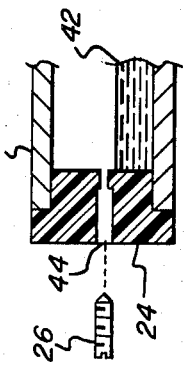
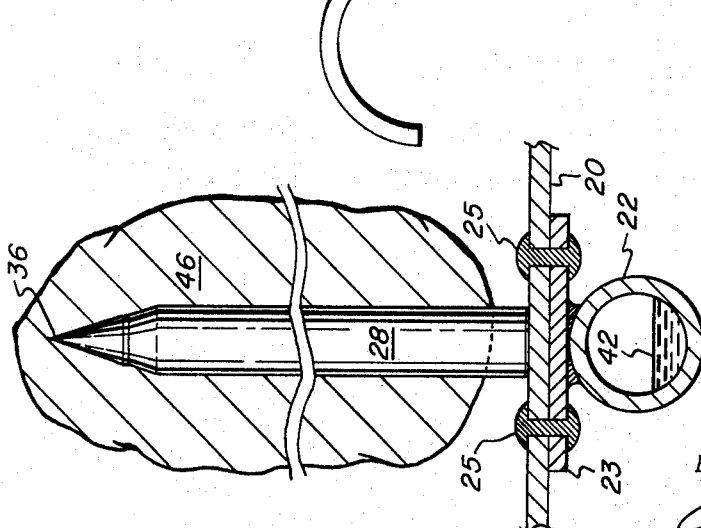
INVENTOR.
WILLIAM PEREZ
BY Edward Halle
ATTY.

United States Patent Office 3,379,118
Patented Apr. 23, 1968

3,379,118
BAKING RACK
William Perez, 153 Meadowsweet Road,
Williston Park, N.Y. 11596
Filed Mar. 28, 1966, Ser. No. 537,877
5 Claims. (Cl. 99—419)

This invention relates to baking racks adapted to be placed in ovens or other heating means, and said baking racks having elements adapted to be positioned within the food to be baked and being adapted to conduct the heat of the oven or other heating means to the food internally to provide means for baking the food internally as well as externally.

It is an object of the invention to provide baking racks having heat conducting means for heating food internally so as to provide quicker baking time for foods such as potatoes, sweet potatoes, onions, apples and any other food in a homogeneous food mass.

It is a further object of the invention to provide such making racks which will produce baked food having moist and tasty consistency inside.

Other objects and advantages will appear in the specification hereinbelow. The invention is illustrated in the accompanying drawings in which:

FIG. 2 is a sectional view along the lines 2—2 of FIG. 1 with parts cut away;

FIG. 3 is a detail taken from FIG. 2 with a screw in exploded position;

FIG. 4 is a sectioinal view along the lines 4—4 in FIG. 2; and

FIG. 5 is an enlarged sectional detail of the upper end of the pin shown in FIG. 2.

Similar numerals refer to similar parts throughout the several views.

Figure 1:
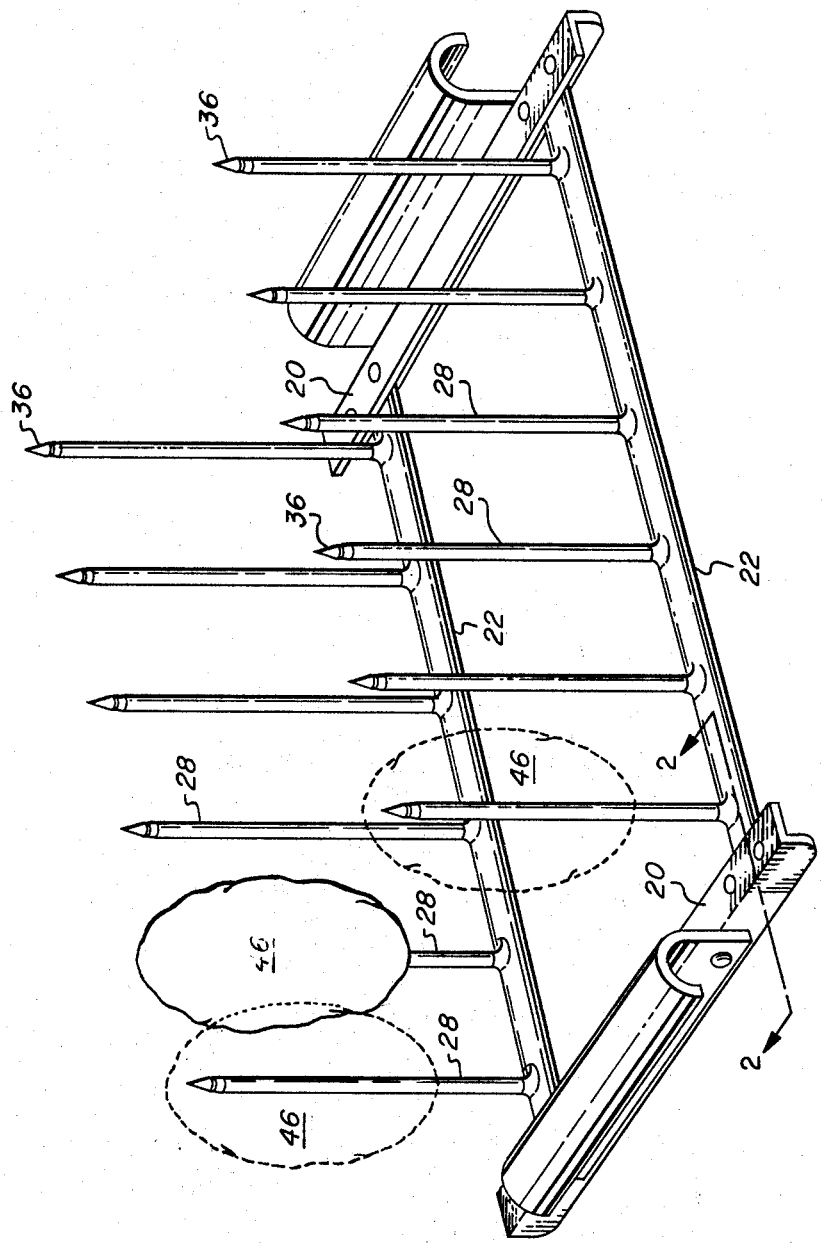
FIG. 1 is a perspective view of the invention.

The main body frame of the invention is made up of a pair of end frame member units such as angles 20 to which one or more hollow frame member means such as tubes 22 are attached. The hollow frame member means 22 are brazed or welded to braces or plates 23 which are then riveted to the frame member end units 20 by means of rivets 25. Of course, any other means of fastening the frame together which does not interfere with the operation or construction of the invention may be used.

While the rack illustrated in FIG. 1 of the drawings has two rack means having six pins each, this is for purpose of illustration only as any number of pins in any desired arrangement can be incorporated into the invention.

Each of the tubes 22 has end closures comprising metal plugs or sealers 24 having swedge screws 26. The sealers 24 are placed in the ends of the tubes 22 and the screws 26 are tightened providing a liquid tight seal. Each tube 22 has pin-like extensions 28 arranged so as to form a rack. Each pin 28 comprises a tube 29 which is brazed into an appropriate opening 30 in tube 22. Each pin 28 has a non-stick sleeve such as a Teflon sleeve 32 placed around it. The Teflon surrounding the pin 28 may be applied to the pin in any manner, and it is not necessary that it be in the form of a slideable sleeve so long as the outer surface of the pin 28 along the tube 29 is comprised of Teflon or other similar non-stick material.

The outer or upper end 34 of tube 29 is tapered to provide for a pointed tip 36 having a plug end 38 which will fit into shaft 29, and an annular shoulder 40 which will cover tapered ends 34 of tube 29. The plug 38 of cap 36 is brazed at upper end 34 of tube 29 as indicated in FIG. 5 of the drawings with the brazing material 39 holding plug 38 to the inner portion of tube 29. This provides a tight seal at upper end 34 of tube 29.

I have now described a closed fluid tight system comprising frame members 22 and pins 28. This system is partially filled with a liquid such as water 42 which can be vaporized. It is desirable that the remainder of the system be evacuated of air, and this is accomplished during the filling operation by heating the vaporizable liquid 42 and letting the air be removed by the action of the steam or vapor of the liquid and then closing the system by screwing in a screw such as screw 26.

This is accomplished through openings such as opening 44. Opening 44 serves three purposes. First, it is the opening through which the vaporizable liquid 42 is introduced into the system. Secondly, it is the opening from which the air is permitted to escape from the system when the liquid is heated so as to evacuate the system, and finally, opening 44 together with screw 26 serves as the permanent seal to seal the system after it has been properly filled with liquid and the air has been evacuated. After the air has been evacuated, the entire system is then permitted to cool and the steam or vapor will be allowed to condense so that there will be a body of liquid and a vacuum within the system. While any liquid may be used in the system which has the qualities necessary for vaporization within the system, I have found that Freon such as Freon 12 of the Du Pont Corporation is a most suitable liquid and serves very well as the vaporizable liquid 42 of the invention.

A food mass 46 such as a potato, onion, apple or any other food in a homogeneous body or mass is impaled onto a pin 28. The normal position of the complete rack is with the frame members 22 beneath and supporting the pins 28 so that the body of liquid 42 will normally be at the bottom of the system, principally in frame members 22. The entire system including the food masses 46 is then subjected to a source of heat, normally by placing it in an oven.

The heat will then affect the food mass 46 externally in the usual manner, and will also heat up the liquid 42 in the hollow frame members 22 and in the system of the device. The liquid 42 will vaporize and the vapor will rise up into the tube 29 of the pin 28. The heat of the vapor will be dissipated through the tube 29 into the food mass 46 and in so doing, the vapor will condense to be heated again at the bottom of the system and come up again as vapor, thereby creating a uniform method of heat transmission and applying it directly to the center of the food mass 46. Thus, the rack serves to hold the food for being heated externally and also will heat the food from an internal position at the same time.

While I have described my invention in its preferred form, there are other forms which it may take without departing from the spirit and scope of the invention, and I, therefore, desire to be protected for all forms of the invention coming within the claims hereinbelow.

I claim:

1. A baking rack having a main body frame including at least one hollow frame member means comprising: a plurality of hollow pins, each including a tube portion, said pins being mounted on top of said hollow frame member means, said pins and said hollow frame member means forming a closed system being partly filled with vaporizable liquid means, said vaporizable liquid means being contained substantially within said hollow frame member means beneath said pins, each of said pins being adapted to receive and hold a food mass in impaled position on the said pin; whereby when a food mass is impaled on the pins and the rack including the food masses is subjected to heat external to said rack and said food mass, the resulting vapors of the vaporizable liquid means will flow upwardly through the tubes of the pins to heat the food masses internally, condense, and return to the hollow frame member beneath the pin.

2. The baking rack as defined in claim 1, in which the vaporizable liquid is Freon.

3. The baking rack as defined in claim 1, in which at least a portion of each of the hollow pins is covered with non-stick material.

4. The baking rack as defined in claim 3, in which the non-stick material is Teflon.

5. The baking rack as defined in claim 3, in which the hollow pins each comprise a tip portion having a plug adapted to be sealed to an end of said tube portion, said tip having an annular shoulder extending outwardly to said Teflon covering.

References Cited
UNITED STATES PATENTS

| | | | |
|---|---|---|---|
| 1,152,241 | 8/1915 | Tomlinson | 99—419 X |
| 1,630,188 | 5/1927 | Knauff | 99—419 |
| 1,969,601 | 8/1934 | Foch. | |
| 2,835,480 | 5/1958 | Perez | 165—105 |
| 3,024,298 | 3/1962 | Goltsos et al. | 165—105 X |
| 3,053,169 | 9/1962 | Rappaport | 99—421 |

WALTER A. SCHEEL, *Primary Examiner.*

A. O. HENDERSON, *Assistant Examiner.*